Feb. 9, 1971   L. RIED, JR., ET AL   3,561,875
TURBIDIMETER
Filed April 27, 1967   11 Sheets-Sheet 5

INVENTORS
LOUIS RIED, JR
CHARLES A. SPRINGER
BY
Campbell & Harris
ATTORNEYS

INVENTORS
LOUIS RIED, JR.
CHARLES A. SPRINGER
BY
Campbell & Harris
ATTORNEYS

FIG. 10

INVENTORS
LOUIS RIED, JR.
CHARLES A. SPRINGER
BY
Campbell & Harris
ATTORNEYS

United States Patent Office 3,561,875
Patented Feb. 9, 1971

1

3,561,875
TURBIDIMETER
Louis Ried, Jr., and Charles A. Springer, Boulder, Colo., assignors to Ball Brothers Research Corporation, Boulder, Colo., a corporation of Colorado
Filed Apr. 27, 1967, Ser. No. 634,384
Int. Cl. G01n 21/00
U.S. Cl. 356—103                                        7 Claims

ABSTRACT OF THE DISCLOSURE

An electro-optical device capable of sequentially testing a predetermined plurality of solutions for particle presence at preselected intervals. Particle presence is indicated by developing a current when light passing through the solution under test is scattered by particles in the solution. Control for the device is provided by timing circuitry wherein the timing interval, as well as the total number of samples to be sequentially tested, are made selectable.

---

This invention relates to a turbidimeter and more particularly to a device for sensing particle presence in a preselected plurality of samples by preselectable sequential testing at preselectable intervals.

It is oftentimes desirable to be able to determine, with a high degree of accuracy, the presence of particles in a solution. One way of accomplishing this end is through the use of a device known as a turbidimeter which, basically, directs a beam of light through the solution to be tested, senses light scattered by particles in the solution, and develops an output current in response thereto.

Turbidimeters have heretofore been known and utilized, but none of these devices have proven to be completely acceptable, due, at least in part, to difficulty of adaption for suitable usage and/or lack of sufficient sensitivity. In addition, it is usually desirable to repeatedly test a number of samples at the same time, and, while some prior devices of this type have been capable of so testing, the devices have failed to provide the needed versatility either in easy adjustability of the minimum or maximum number of samples that can or must be tested at any one time, in easy adjustability of the time interval allotted to each sample test, or in easy adjustability of order of sequencing of the samples.

It is the purpose of this invention to provide a turbidimeter that overcomes the objections to prior devices of this type and thus make available a device capable of, or adaptable to, usage in those fields wherein particle detection is desirable or in some cases mandatory, including, for example, uses in such fields as smog monitoring, undersea plankton counting, microbial detection, micrometeorite detection, and collidal chemistry.

It is therefore an object of this invention to provide an improved turbidimeter suitable for use in and/or adaptable to an expanded variety of fields.

It is another object of this invention to provide an improved turbidimeter capable of sequentially testing a preselectable number of samples for preselectable time intervals.

It is yet another object of this invention to provide an improved turbidimeter wherein the number of channels utilized at any one time for testing can be readily varied, the testing sequence set up in any desired fashion, and the direction of the sample period adusted as deemed necessary.

2

It is yet another object of this invention to provide an improved turbidimeter which includes a commutator responsive to timing circuitry output for controlling the sequential testing of samples, a code converter to make the turbidimeter compatible with certain read-out equipment, and slow turn-on means for protecting the illumination lamp in each detector.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the herein-disclosed invention are meant to be included as come within the scope of the claims.

The accompanying drawings illustrate a complete embodiment of the invention according to the best mode so far devices for the practical application of the principles thereof, and in which.

Referring now to the drawings, a plurality of detectors 15 are indicated connected to relay boards 16. Twelve detectors and four relay boards have been indicated in FIGS. 1 and 2 (with each relay board having three circuits to thus correspond in number to the number of detectors), but it is to be realized that the number of detectors can be varied as necessary as can the number of relay boards so long as a relay circuit is available for each detector utilized.

Relay boards 16 control the detector to be activated and sequentially cause actuation of the detectors through lamp regulator 18 which provides slow turn-on of the lamp in the detector activated.

The relays on relay boards 16 are, in turn, controlled by timer 20 acting through commutator 21 and patch circuit 22. Timer 20 provides an output at timed intervals (which intervals can be adjusted) to thus cause patterned sequential testing of samples by the various detectors. Commutator 21 shifts the output from the timer, which is in binary form, to a twelve-line output (when twelve detectors are utilized) to enable activation of each detector in sequence. Patch circuit 22 provides selectability in the sequencing order of the detectors and also provides ready selectability in the number of detectors to be sequentially activated. For example, if only four detectors are to be activated, then the patch circuit is connected to only four circuits in the relay board (in any sequence desired) so that the commutator output will repeatedly cause only four of the detectors to be activated in the order selected. This is important since no testing time is lost activating unused detectors.

Commutator 21 also supplies an output to indicating lamps 24 (through the code converter 36) so that the detector activated can readily be ascertained.

The output from the activated detector is coupled through the relay board to utilization means, such as by coupling the output to detector amplifier 26 (common to all detectors) and then to a digital voltmeter 28, which voltmeter also receives an input from timer 20. If desired, the output from the amplifier could also be supplied directly to analog monitoring equipment. If an output is received from the detector through amplifier 26 and from timer 20, the digital voltmeter supplies a binary coded output (shown as a 1, 2, 2, 4 digital coded output by way of example in FIG. 1) through coupler 30 to a conventional data paper punch 32 and/or a conventional data printer 34, which printer also receives an input from timer 20 and in input from commutator 21. The output from commutator 21 is coupled to the printer through a code converter 36 when the output of the commutator is not compatible with the input from the digital voltmeter, as is the case, for example, when the digital voltmeter output is a 1, 2, 2, 4 digital coded output (as indicated by way of example in FIG. 1) and the commutator output is a twelve-line output (as also indicated in FIG. 1).

Figure 2:
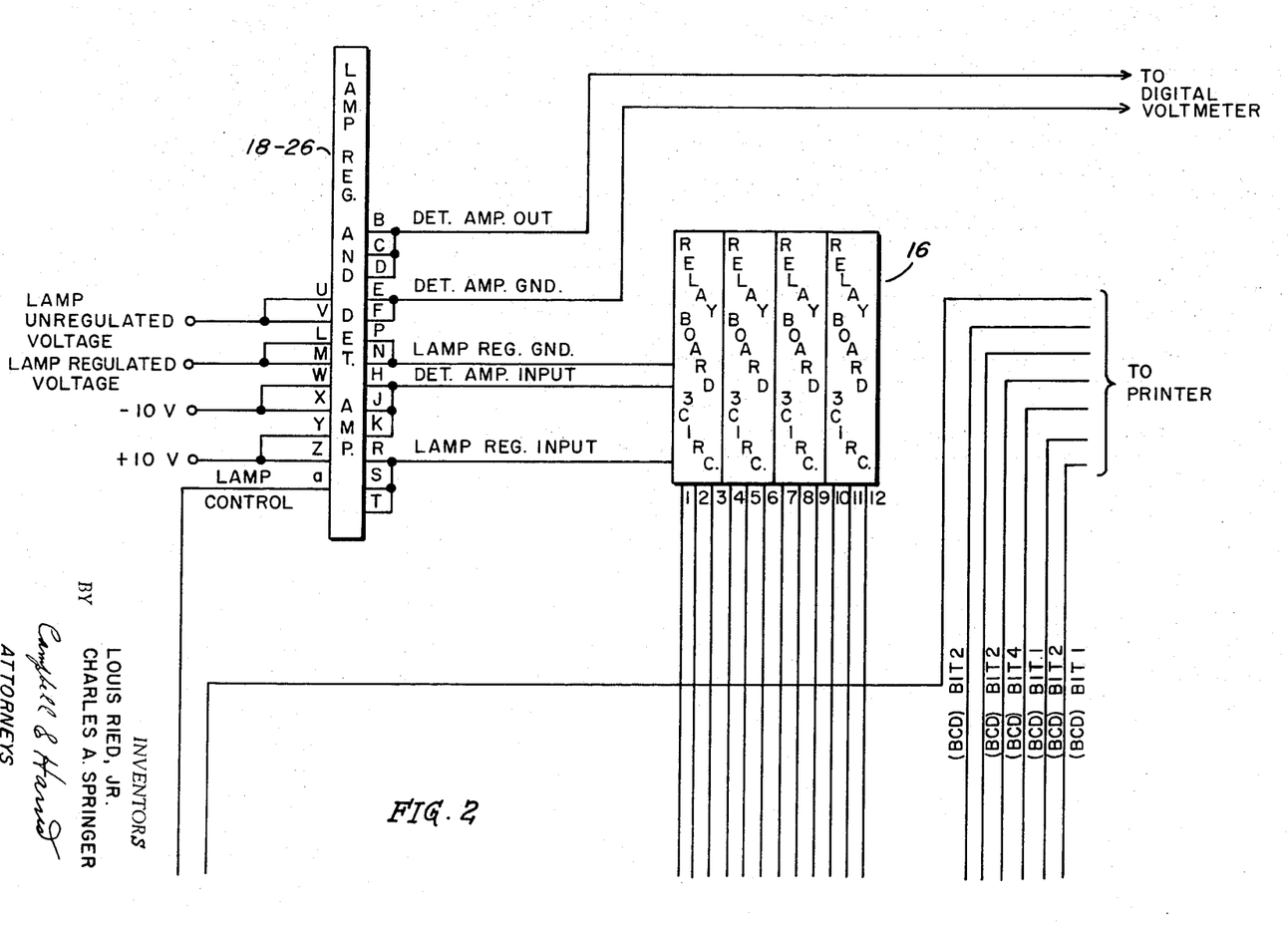
FIGS. 2 and 3 show an expanded block diagram of the turbidimeter of this invention.
Figure 3:
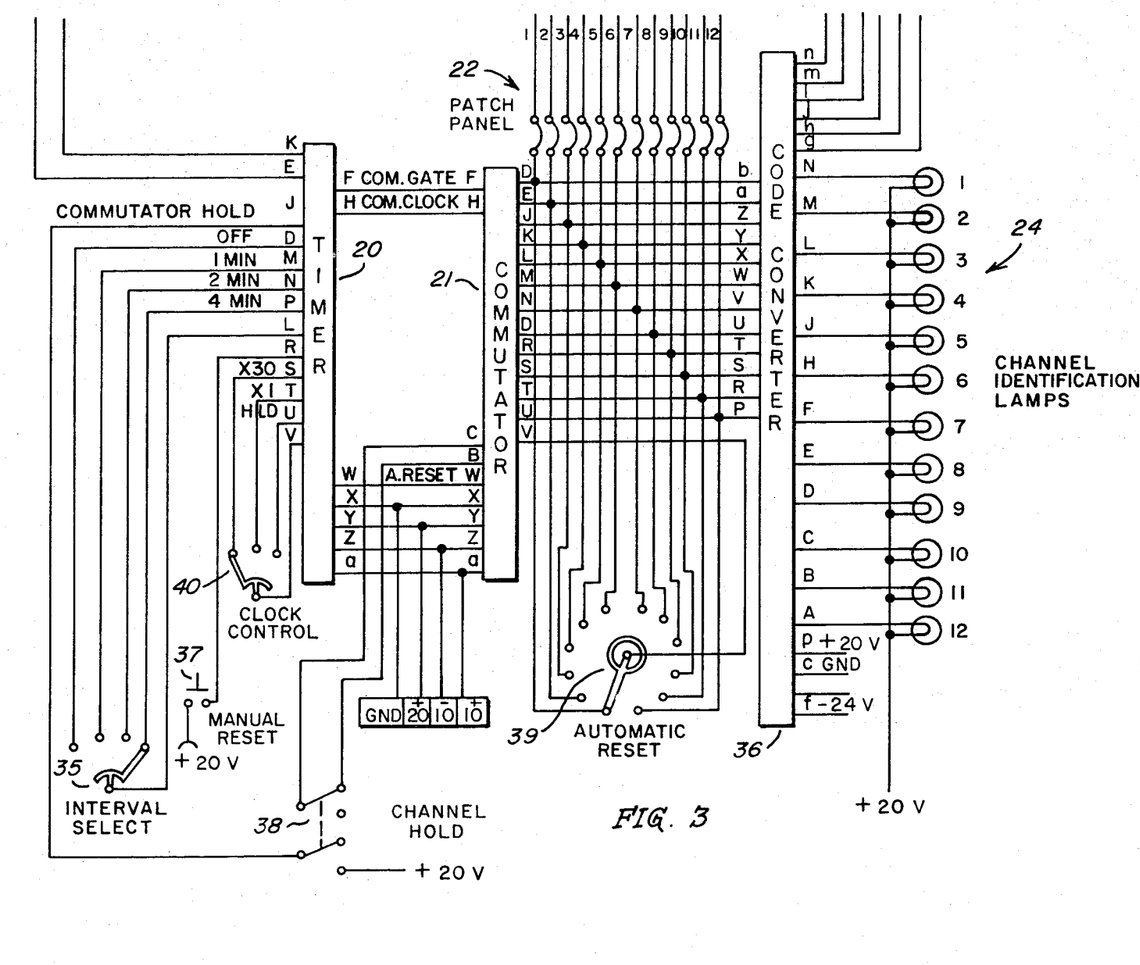

Referring now to FIGS. 2 and 3, which show an expanded block diagram of the turbidimeter, and more particularly, shown in more detail, the connections between the block form illustrated components which are then shown in schematic form with consistent connection designations in subsequent figures.

As shown in FIG. 2, the lamp regulator and detector amplifier have been combined in a single block designated 18–26. For simplicity, the output from only one relay board is shown connected to the lamp regulator and detector amplifier, but it is to be realized, of course, that the other relay boards are connected in the same manner so that, as indicated in FIG. 1, only a single lamp regulator and a single detector amplifier is utilized regardless of the number of sample detectors utilized.

Figure 1:
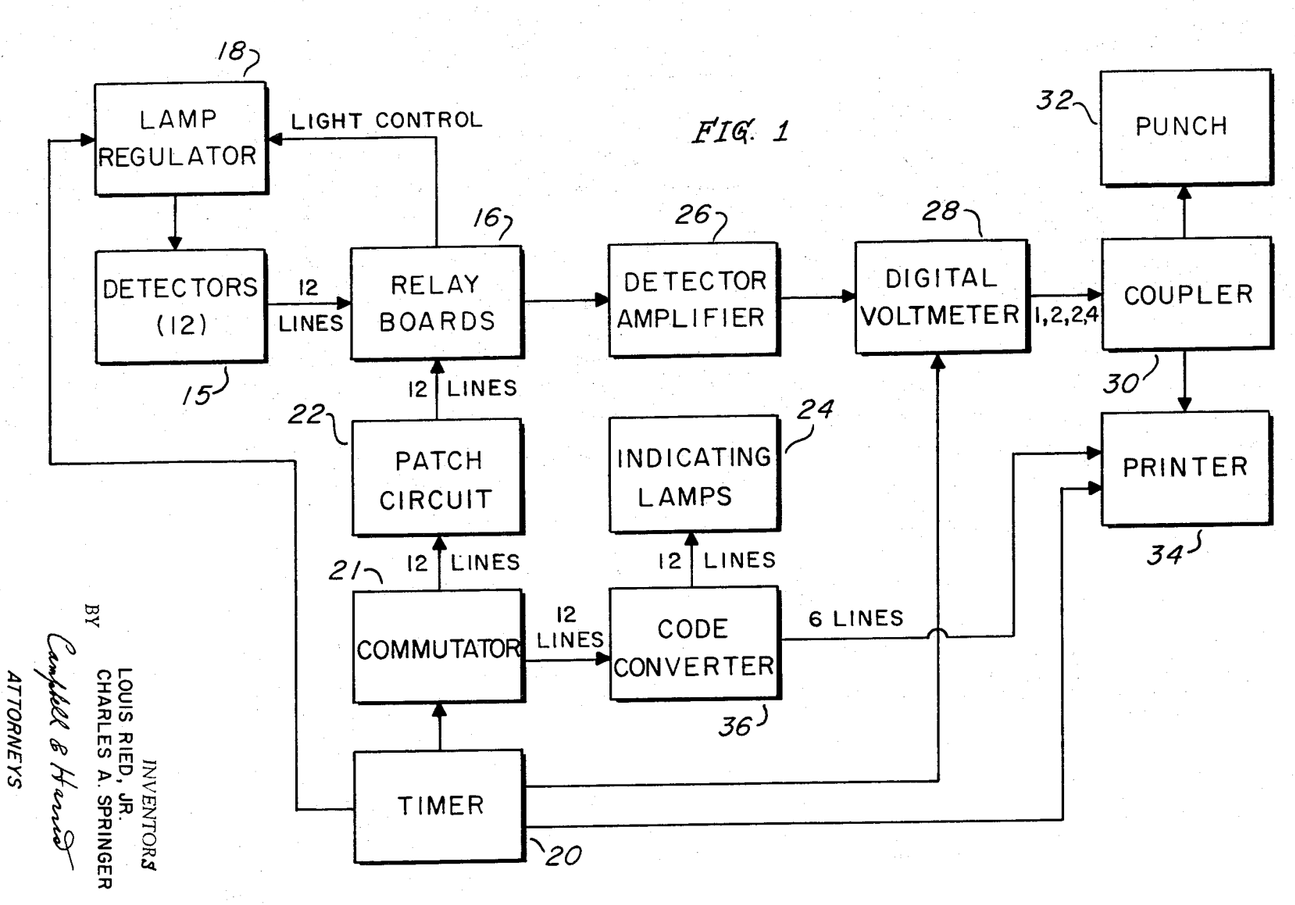
FIG. 1 is a block diagram of the turbidimeter of this invention.
Figure 4:
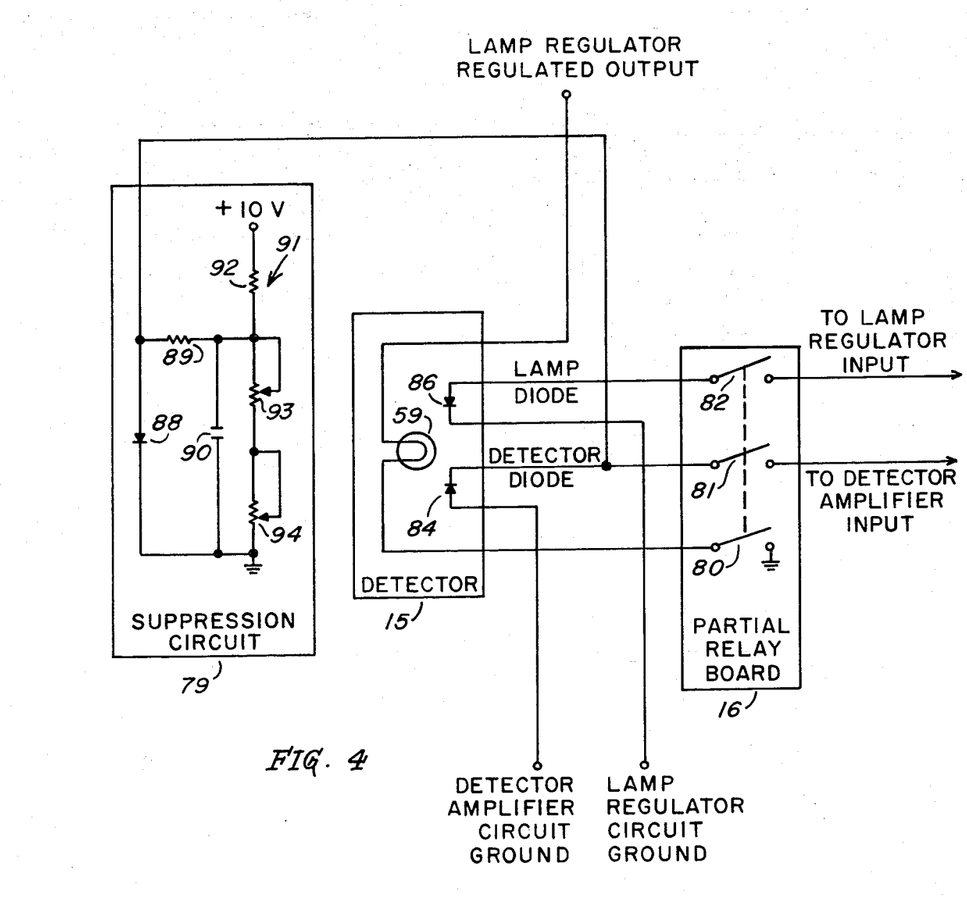
FIG. 4 is a schematic diagram illustrating the detector and suppression circuit included in this invention.
Figure 6:
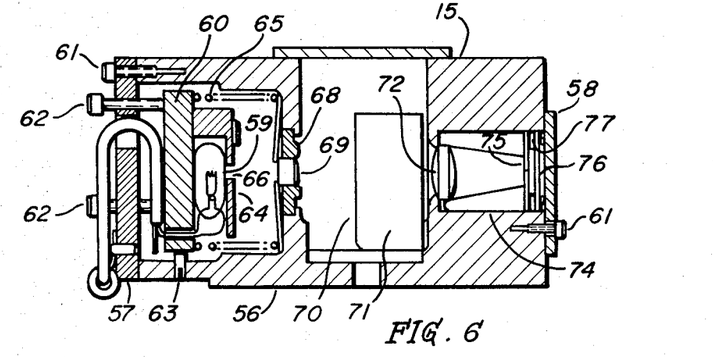
FIG. 6 is a side section showing in detail the detector used in the turbidimeter of this invention.

As indicated in FIG. 1, and as shown in more detail in FIG. 4, each sample detector utilized (the sample detector is shown in FIG. 6) is connected through a separate set of relay-actuated switches to the detector amplifier. Thus, the number of relays utilized is determined by the number of sample detectors (since one set of relays is obviously needed for each sample detector).

The timing and sequencing circuitry of the turbidimeter is shown in FIG. 3, and has a twelve-detector unit handling capability since this number of detector units has been shown for illustration purposes. Accordingly, the timing and sequencing circuitry provides a twelve-line output as well as a converter for reconverting the output to a binary digital output if needed for compatibility in data handling equipment.

In addition to the expanded and designated component connections, FIG. 3 includes several specific controls for the timing and sequencing circuitry. An interval-select 35 is provided to adjustably select the time that each sample detector is activated, and as shown in FIG. 3, the period can be selected as one, two, or four minutes. The time period could be made further adjustable, of course, as is deemed necessary or desirable either by expanding the time periods or making more periods available for selection. In addition, since binary circuits are utilized in the timing and sequencing circuits, these circuits can be reset manually by means of manual rest 37 or automatic rest 39. The two remaining controls shown in FIG. 3 are the channel hold switch 38 and the clock control switch 40.

As shown in FIGS. 2 and 3, the twelve-line output produced by commutator 21 is coupled through patch circuit 22 to the relay boards 16, and through code converter 36 to the lamp indicator 24 (which lamp indicates the particular sample detector activated), the code converter producing a binary digital output (indicated as bit outputs on separate lines in FIG. 2) compatible for use in a conventional printer receiving the same type of output (as through a coupler from a digital voltmeter as indicated in FIG.1 ).

The commutator output can be applied to the relay boards in any desired manner and in any sequence by means of patch circuit 22. For example, the outputs could be connected sequentially to outputs 1 through 12 coupled to the relay board (as indicated in FIGS. 2 and 3) or could be easily connected in any other manner such as, for example, by connecting output D from the commutator to relay line 10 so that this sample detector is first activated, or, again by way of example, connecting only relay lines 8, 2, and 6, to commutator outputs D, E, and J, so that only three sample detectors are sequentially activated in the order 8, 2, and 6.

Figure 5:
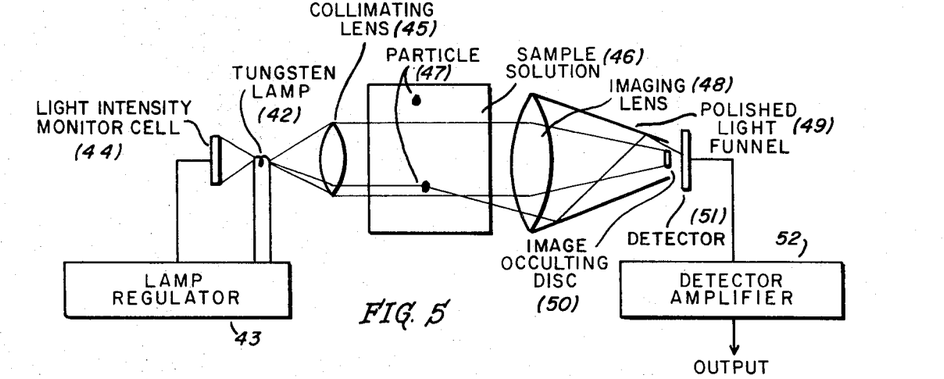
FIG. 5 is a functional diagram of the detector used in the turbidimeter of this invention.

Turning now more particularly to the sample detectors utilized in the turbidimeter of this invention to make tests of solutions, a simplified functional diagram of this general type of detector is shown in FIG. 5.

As shown in FIG. 5, this type of electro-optical detector can be achieved by the use of a tungsten lamp 42 controlled by a lamp regulator 43, the intensity of which can be monitored by light intensity monitor cell 44. A beam of light is directed from the lamp through a collimating lens 45 to an area wherein a sample solution 46, having particles 47 therein, is placed in the light path. That portion of the light beam having particles in the light path is scattered while the other portion of the light beam passes through the test solution without deviation, as is known in the art. At the side of the test solution opposite to the lamp, there is placed an imaging lens 48 to receive the light beam after it is passed through the solution. The light that is scattered is then directed through a polished light funnel 49 past an image occulting disc 50 (disc 50 occults the undeviated light beam) to a detector 51, which detector is light sensitive and capable of generating current when light is received, as is well known in the art. The current from the detector is then amplified by an amplifier 52 and the output is then ready for utilization, as, for example, by a digital voltmeter.

A side sectional view of the sample detector utilized in the turbidimeter of this invention is shown in FIG. 6. As shown in FIG. 6, a housing 56 supports the various detector parts, and opposite end caps 57 and 58 are conventionally attached as by screws 61 to the housing. Lamp 59 is supported within the housing on an adjustable block 60. Adjustment of block 60 is achieved by means of screws 62 in end cap 57 (to tilt the block) and set screws 63 (only one shown in FIG. 6) in housing 56 (to laterally position the block). A spring 65 holds the adjusting block 60 in position against screws 62, and a lamp mask 64 extends outwardly and around lamp 59 so that light is emitted outwardly and forwardly through an aperture 66.

As also shown in FIG. 6, a lens holder 68 is mounted in the housing forwardly of the lamp 59. Lens holder 68 positions a lens 69 in the light path from the lamp and directs the light beam at area 70, in which area the sample 71 to be tested is placed. At the opposite side of area 70, a second lens 72 is mounted in housing 56 to receive the light after it has passed through the solution to be tested.

A sleeve 74 extends from lens 72 and inside this sleeve is a centrally located polished light funnel and, near the end, opposite lens 72, an occulting disc 75 is positioned in front of a detector 76, the two being spaced by a spacer ring 77. Received light at detector 76 is converted in the detector to a current which is coupled from the detector for utilization.

Referring now to FIG. 4, an electrical schematic showing the connection of sample detector 15 to a set of relay-actuated switches on relay boards 16, as well as a suppression circuit 79 for the detector diode, is shown. Lamp 59 is shown connected at one side to switch 80 on relay board 16 (the other side of switch 80 being grounded), while the other side of lamp 59 is connected to the lamp regulator regulated output which, as shown in FIG. 2, is connected to lamp regulating and detector amplifier 18–26. Only a partial relay board 16, sufficient for controlling one detector, has been shown for explanatory purposes in FIG. 4, and hence, only three switches 80, 81 and 82, are shown.

Figure 7:
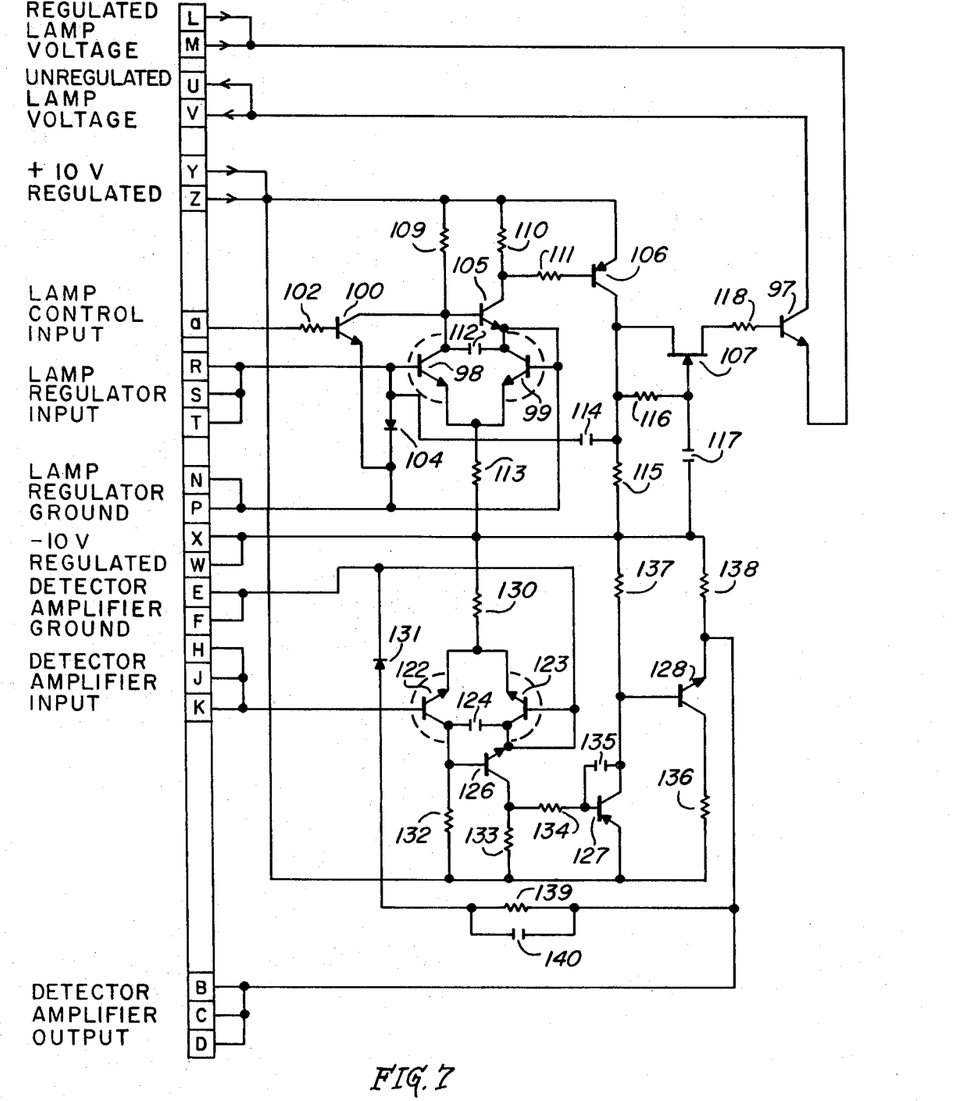
FIG. 7 is a schematic diagram of the lamp regulator and detector amplifier shown in block form in FIGS. 1 through 3.

Detector diode 84 in sample detector 15 (included in detector 76 as shown in FIG. 6) is connected at one side to switch 81 (the other side of switch 81 leads to detector amplifier 26), while the other side of diode 84 is connected to the detector amplifier circuit ground at detector amplifier 26 (see FIGS. 2 and 7). In like manner, lamp diode 86 (positioned near the lamp to sense the light level of lamp 59 and not shown in FIG. 6) is connected at one side to switch 82 (the other side of switch 82 being connected to lamp regulator 18), while the other side of lamp diode 86 is connected to detector amplifier circuit ground at lamp regulator 18 (see FIGS. 2 and 7).

Suppression circuit 79 is connected to the detector diode and this suppression circuit is utilized for establishing an initial balance to adjust the sample detector output to a reference level, generally 0 volt. Suppression circuit 79 includes a diode 88, the anode of which is connected to the cathode of diode 84 and the cathode of which is grounded. In addition, a resistor 89 and capacitor 90, connected in series with one another, are connected across diode 88, and the junction of resistors 89 and capacitor 90 is connected to the junction of series connected resistors 92 and 93, together with series connected resistor 94, from a voltage divider 91 between a +10 volt power supply and ground.

Referring now to FIG. 7, a schematic diagram of the detector amplifier and lamp regulator of the turbidimeter detector of this invention is shown. It can be seen that the lamp regulated voltage output from the lamp regulator and the lamp unregulated voltage to the lamp regulator are coupled to the emitter and collector, respectively, of transistor 97, which transistor forms a part of the lamp regulator circuit. Lamp regulator input (from sample detector 15) is coupled to lamp regulator 18 at the base of transistor 98, which transistor has its emitter connected in common with the emitter of transistor 99. In addition, lamp control input (from timer 20 as shown in FIGS. 1, 2 and 3) is connected through transistor 100 and resistor 102 to the lamp regulator, while the lamp regulated ground is coupled directly to the base of transistor 99, and to the base of transistor 98 through diode 104. The collectors of transistors 98 and 99 are connected to the base and emitter, respectively, of transistor 105, the collector of which transistor is connected through resistor 111, transistor 106, field effect transistor 107 and resistor 118 to the base of transistor 97.

The detector amplifier 26 has the detector amplifier input (from sample detector 15) coupled to the base of transistor 122, which has its emitter connected to the emitter of transistor 123. The output from the detector amplifier is taken from the emitter of transistor 128, the base of which transistor is connected to transistors 122 and 123 through transistors 126 and 127, and resistor 134. The output voltage expressed in volts per microamperes is directly proportional to the product of the circuit and the feedback resistor 139.

Figure 8:
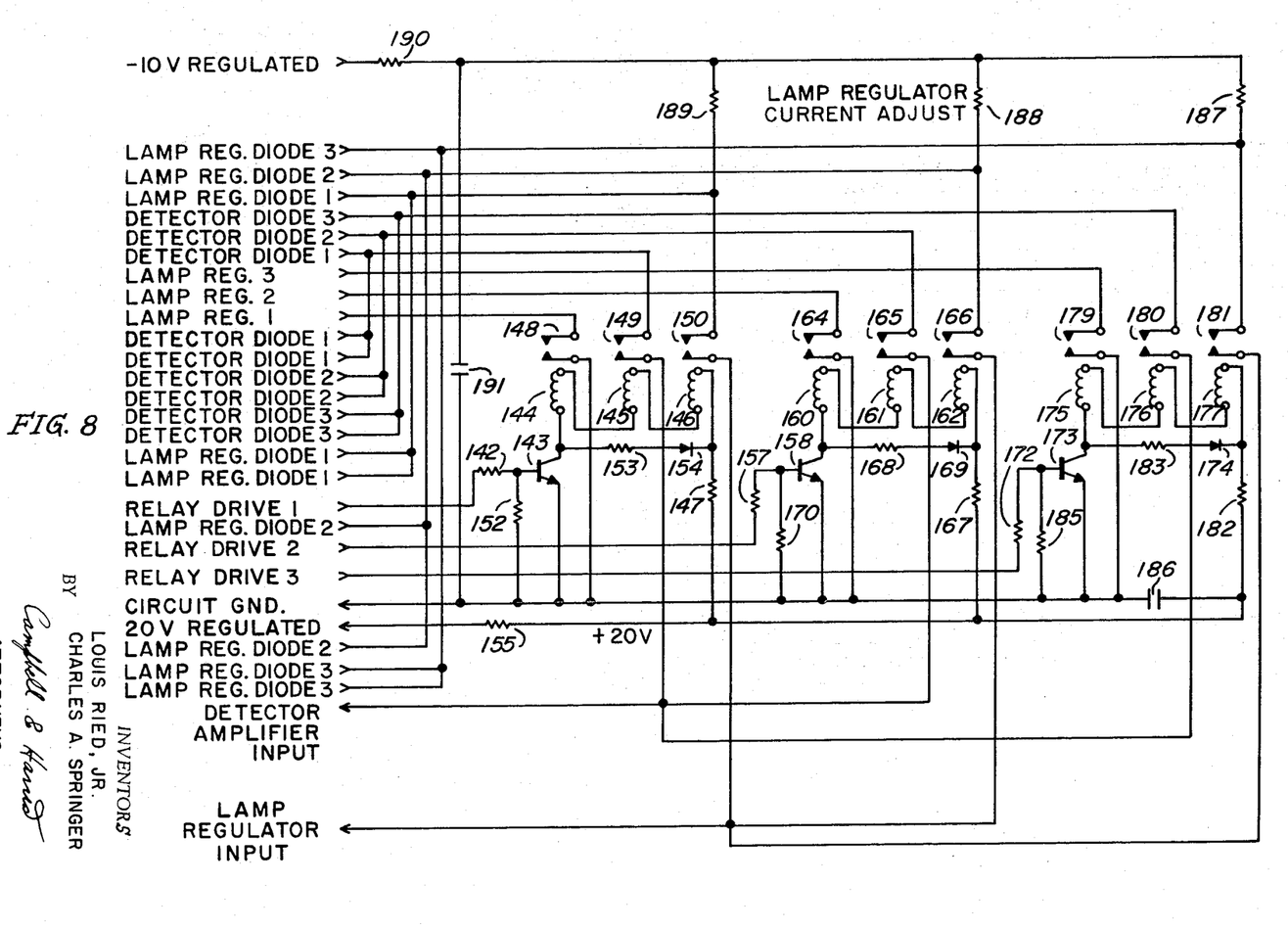
FIG. 8 is a schematic diagram illustrating the relay board shown in block form in FIGS. 1 through 3.

Referring now to FIG. 8, which is the schematic diagram of one of the four circuit boards shown in 2, it can be seen that nine relays and relay actuated switches are included (three for each sample detector, as shown in FIG. 4). Each set of three windings is connected to receive a relay drive (from lines 1 through 12 from the commutator through patch circuit 22) through a series connected transistor and resistor so that all three relays of the set are actuated simultaneously when the associated sample detector is so activated. As can be seen from FIG. 8, and as shown in FIG. 4, energizing of a relay set causes the relay actuated switches to close to energize the lamp in the associated sample detector and connect the detector and lamp diode into the circuit. The current level of the lamp in each detector is initially set by a resistor for each detector, shown in FIG. 8 as resistors 187, 188 and 189.

Figure 9:
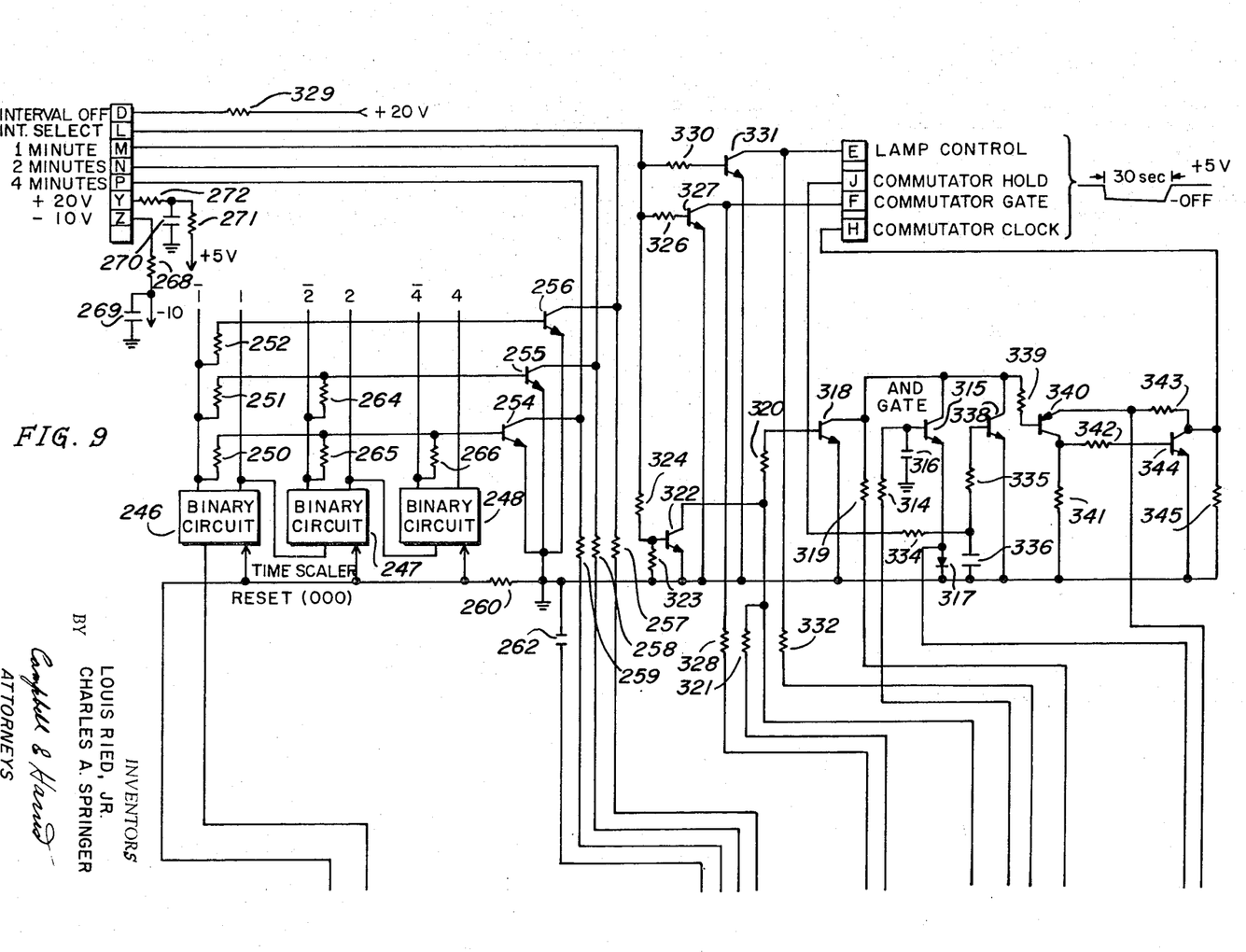
FIGS. 9 and 10 show the schematic diagram of the timer shown in block form in FIGS. 1 through 3.
Figure 10:
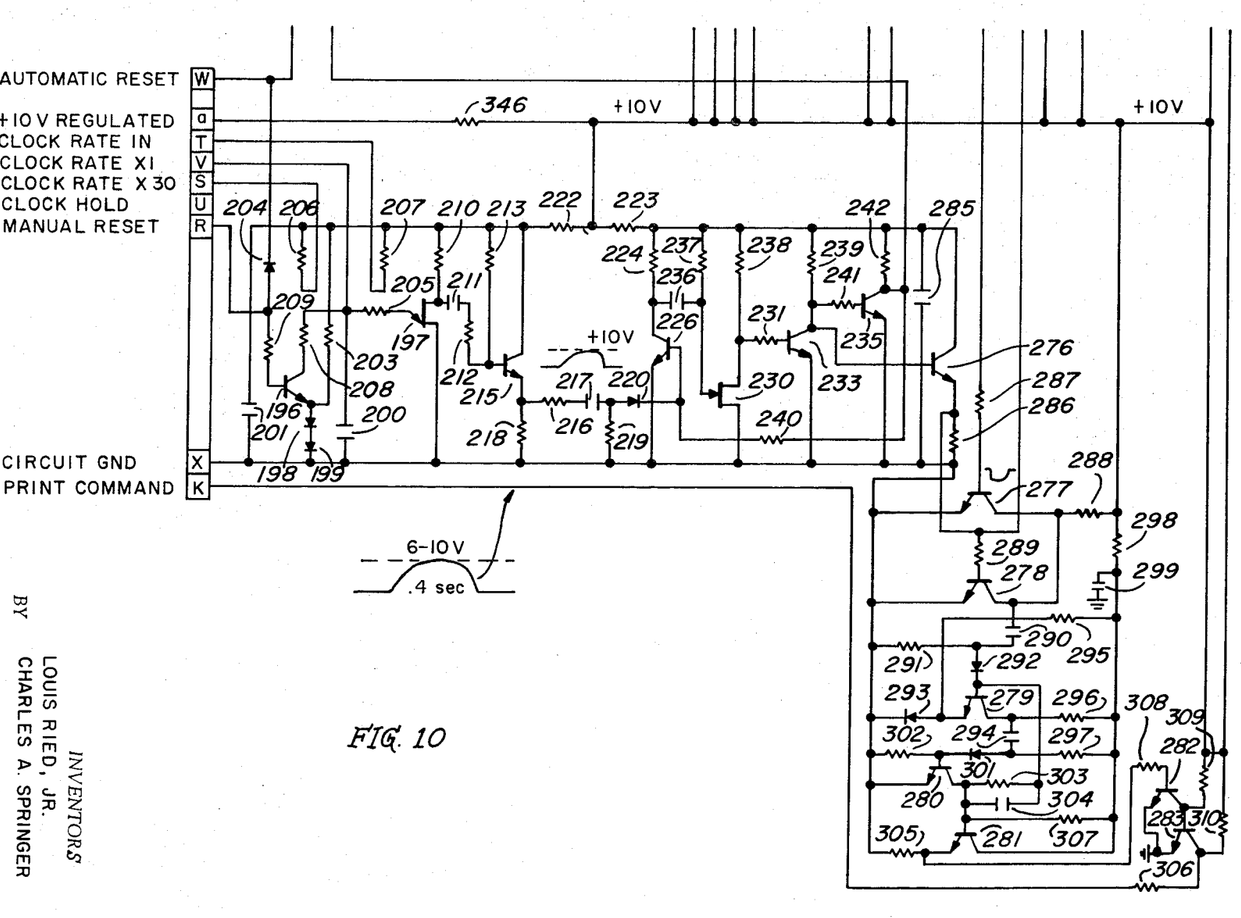
Figure 11:
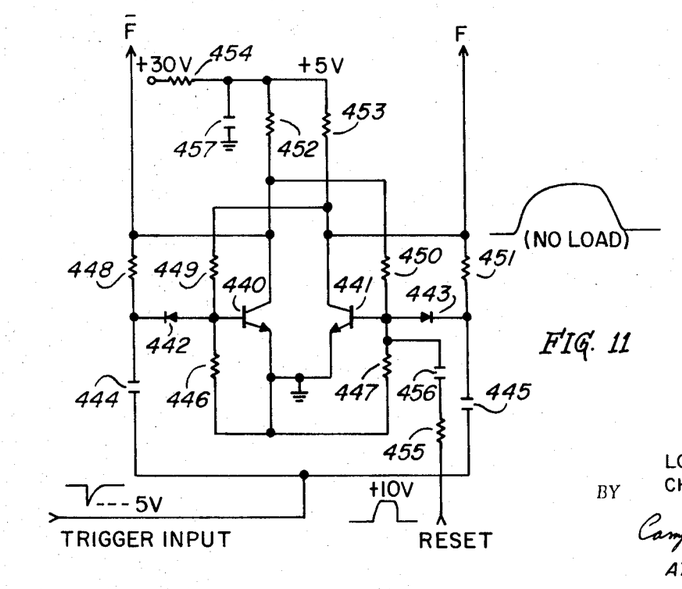
FIG. 11 is a schematic diagram illustrating the binary circuit shown in block form in the timer illustrated in FIGS. 9 and 10.

Referring now to FIGS. 9 and 10, which show the schematic of the timer 20 utilized in this invention, clock pulses are generated by that portion of the circuit including unijunction transistor 197 which reset is provided through transistor 196. Clock pulse output is coupled from the emitter of transistor 215 to a two second monostable delay which includes field effect transistor 230 (shown in FIG. 10). The output from this delay is coupled from the collector of transistor 235 to three binary circuits 246, 247 and 248 (a schematic diagram for which is shown in FIG. 11). It is the purpose of the three binary circuits to provide the one, two and four minute selectable intervals through a timing resistor matrix the output of which is coupled through driver transistors 254, 255, and 256.

A second output from the two second delay circuit is coupled from the collector of transistor 233 and coupled through driver transistor 276 to a network of gates to generate the signals for the commutator and lamp control and provides command signals to operate external or remote control equipment.

Figure 12:
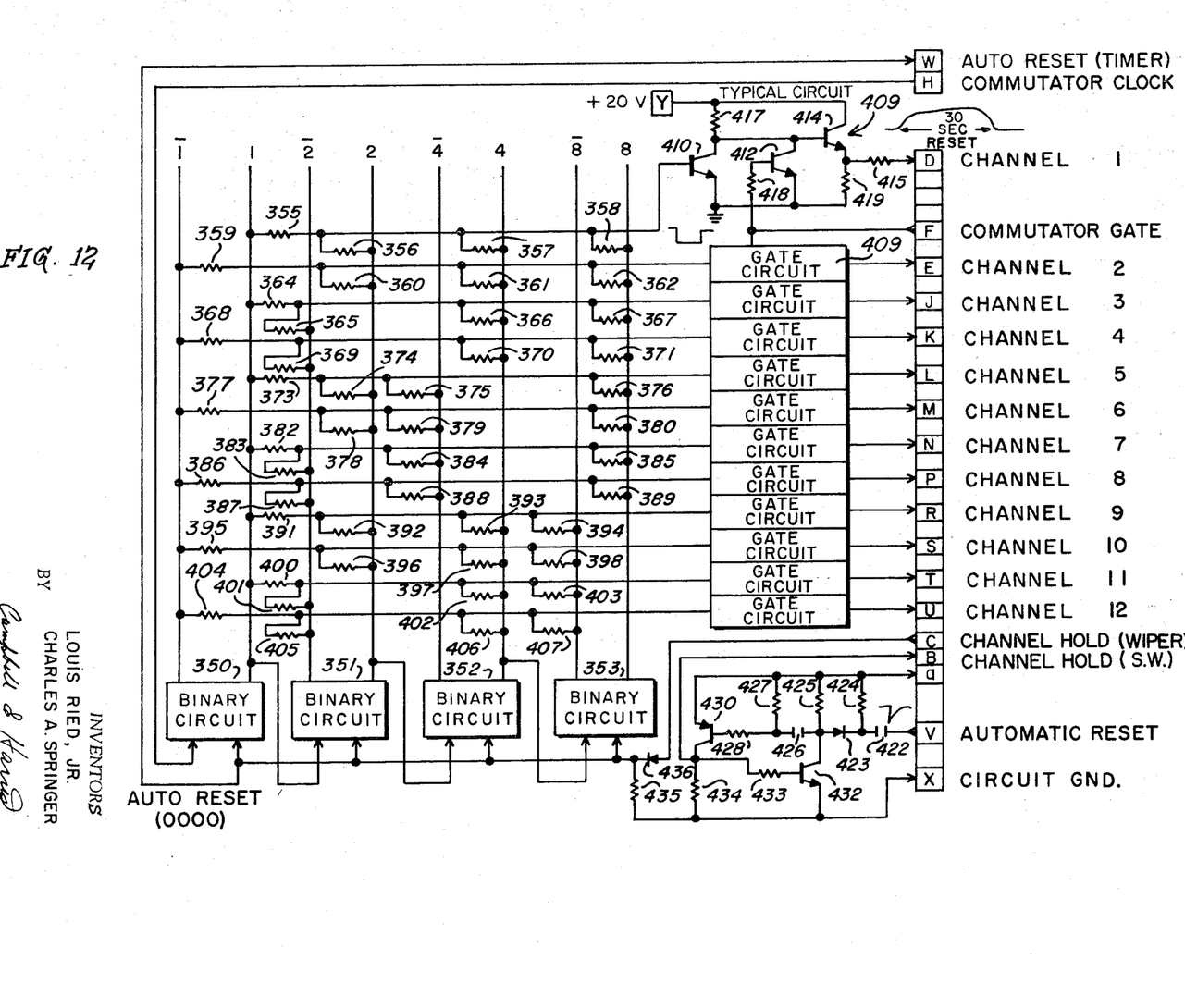
FIG. 12 is a schematic diagram illustrating the commutator shown in block form in FIGS. 1 through 3.

Referring now to FIG. 12, which shows the schematic diagram of the commutator, it can be seen that the clock input from the timer controls binary circuits 350 to 353 so that the commutator provides a twelve-line or channel sequential output through a resistor matrix. As shown in FIG. 12, the output circuit to each channel includes a gate circuit (channel 1 is shown in detail) controlled by a commutator gate input (also from timer 20). The last channel selected for a particular sequencing is coupled back to a reset monostable, which includes transistors 430 and 432, to reset the commutator binary circuits 350–353 to initiate another sequence.

A binary circuit, such as shown in block form in FIGS. 9 and 12, is shown in schematic form in FIG. 11. As is common, the circuit includes a pair of transistors 440 and 441 having grounded emitters and resistance coupling between the base of one transistor to the collector of the other. The trigger input is coupled to the base of both transistors to cause it to change states when a trigger input is received, and a reset pulse is supplied to the base of transistor 441.

Figure 13:
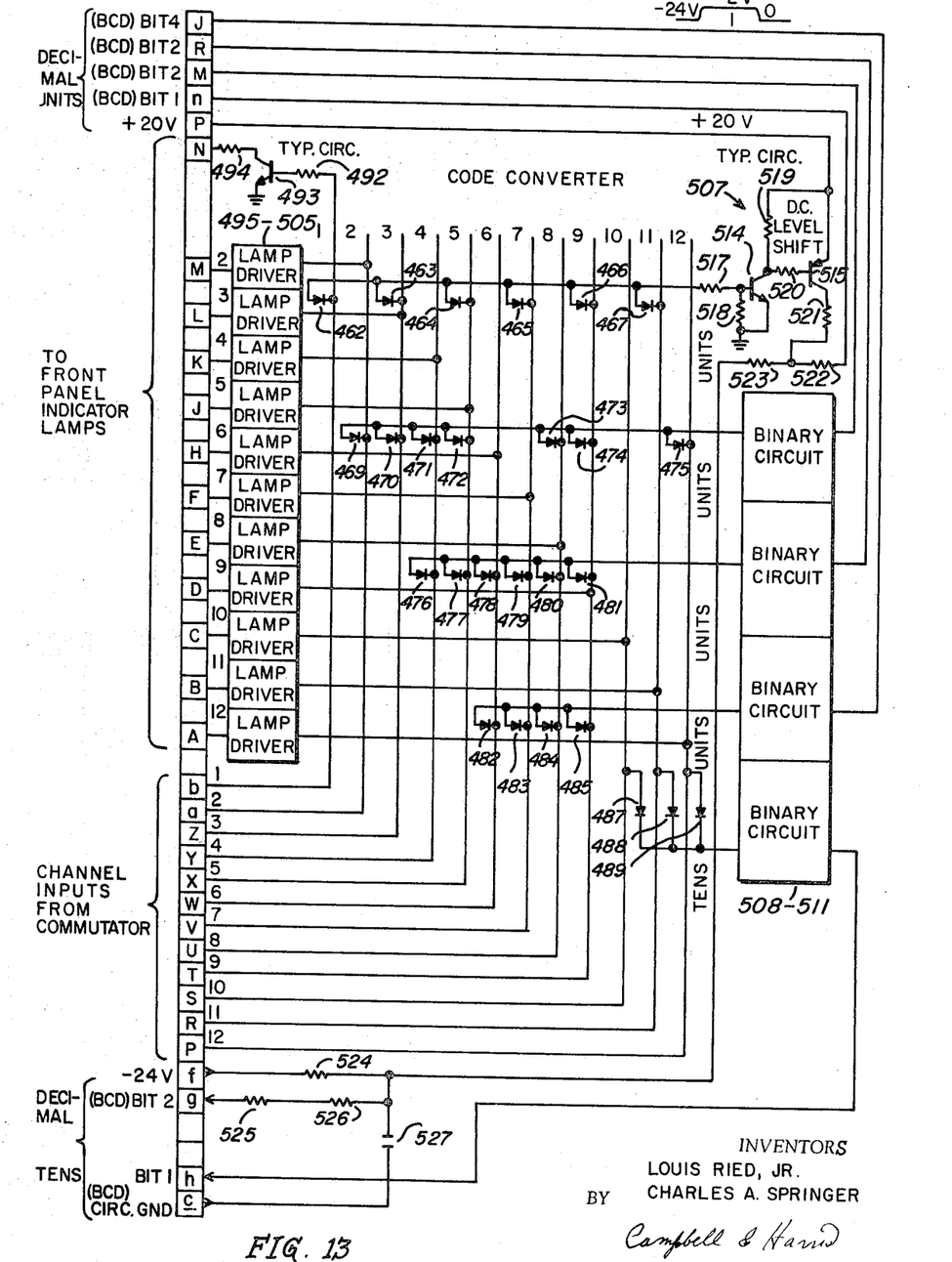
FIG. 13 is a schematic diagram illustrating the code converter shown in block form in FIGS. 1 through 3.
Figure 14:
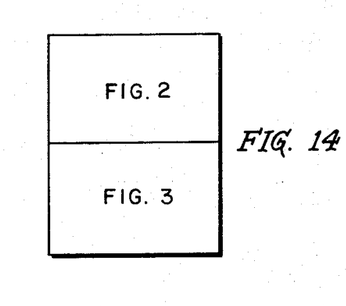
FIGS. 14 and 15 show the manner in which FIGS. 2 and 3, and 9 and 10, respectively, are adjacently placed for viewing of the entire schematic diagram.
Figure 15:
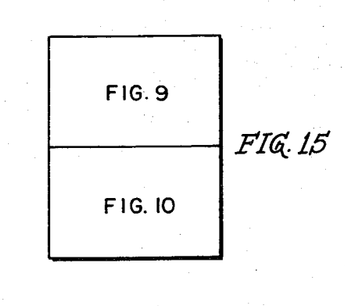

Referring now to FIG. 13, which is a schematic diagram of the code converter, it can be seen that the twelve-line input (which is a decimal input) is coupled through a diode code converter matrix and binary circuits to produce the desired binary output, in this case a 1, 2, 2, 4 binary decimal coded output (BCD) which makes the output from the commutator compatible for use in a printer which also receives a 1, 2, 2, 4 input from the digital voltmeter. A typical circuit for the binary circuits is shown in schematic form as binary circuit 507 in FIG. 13. As is also shown, the input to each indicating lamp is coupled from the commutator through the code converter which includes a lamp driver for each (one typical driver circuit is shown in FIG. 13).

The output produced by the code converter is a 1, 2, 2, 4 converter coded signal as follows:

BINARY CODED DECIMAL (BCD)

| Channel No. (decimal | Pin Units | | | | Pin Tens | |
|---|---|---|---|---|---|---|
| | N | M | K | J | H | G |
| | Bit | | | | | |
| | 1 | 2 | 2 | 4 | 1 | 2 |
| 1 | 1 | 0 | 0 | 0 | 0 | 0 |
| 2 | 0 | 1 | 0 | 0 | 0 | 0 |
| 3 | 1 | 1 | 0 | 0 | 0 | 0 |
| 4 | 0 | 1 | 1 | 0 | 0 | 0 |
| 5 | 1 | 1 | 1 | 0 | 0 | 0 |
| 6 | 0 | 0 | 1 | 1 | 0 | 0 |
| 7 | 1 | 0 | 1 | 1 | 0 | 0 |
| 8 | 0 | 1 | 1 | 1 | 0 | 0 |
| 9 | 1 | 1 | 1 | 1 | 0 | 0 |
| 10 | 0 | 0 | 0 | 0 | 1 | 0 |
| 11 | 1 | 0 | 0 | 0 | 1 | 0 |
| 12 | 0 | 1 | 1 | 0 | 1 | 0 |

A list of components for illustration purposes, the invention not being meant to be limited thereto, is as follows:

Resistors: 89–499K; 92–20K; 93–10K; 94–500; 102–30K; 109–1M; 110–60K; 111–2.2K; 113–449K; 115–47K; 16–1M; 18–510; 130–5M; 132–10M; 133–100K; 134–2.2K; 136–510; 137–100K; 138–47K; 139–3.2M; 142–4.6K; 147–510; 152–100K; 153–100; 155–51; 157–4.6K; 167–510; 168–100; 172–4.6K; 182–510; 183–100; 185–100K; 190–51; 203–110K; 205–20; 206–20K; 207–499K; 208–510; 209–10K; 210–549; 212–20K; 213–51K; 216–20K; 218–51K; 219–51K; 222–51; 223–51; 224–20K; 231–30K; 237–443.2K; 238–15.6K; 239–5.1K; 240–51K; 241–62K; 242–20K; 250–30K; 251–30K; 252–30K; 257–10K; 258–10K; 259–10K; 260–100K; 264–30K; 265–266–30K; 268–51; 272–51; 286–20K; 287–62K; 288–289–20K; 291–51K; 295–100K; 296–20K; 297–100K; 298–51; 302–51K; 303–150K; 305–51K; 306–100; 307–20K; 308–51K; 309–30K; 310 and 314–20K; 320–62K; 321–30K; 323–51K; 324–62K; 326–56K; 328–5.1K; 329–20K; 330–62K; 332–30K; 334–51K; 335 and 339–51K; 341–51K; 342–30K; 343–20K; 345–11K; 346–51; 355–30K; 356–358–30K; 360–362–30K; 364–371–30K; 373–380–30K; 382–389–30K; 391–398–30K; 400–407–30K; 415–1K; 417–20K; 418–30K; 419–10K; 424–20K; 425–20K; 427–20K; 428 and 433–51K; 434–20K; 435–10K; 446–447–43K; 448–10K; 449–450–6.2K; 451–10K; 452–453–1K; 455–15K; 492–18K; 494–700; 517–78K; 518–10K; 519–100K; 520–62K; 521–12K; 522–100K; 523–13K; 524–51; 525–100K; 526–8.2K.

Capacitors: 90–.01 µfd.; 112–.1 µfd.; 114–.1 µfd.; 117–1.0 µfd.; 135–.001 µfd.; 140–0.1 µfd.; 186–10 µfd.; 200–100 µfd.; 201–10 µfd.; 211–.01 µfd.; 217–.01 µfd.; 236–10 µfd.; 262, 269, 270 and 285–10 µfd.; 290–0.1 µfd.; 294–4.7 µfd.; 299–10 µfd.; 304–100 pfd.; 316–2000 pfd.; 336–.1 µfd.; 422–180 pfd.; 426, 444, and 445–220 pfd.; 456–.001 µfd.; 457–10 µfd.; 527–10 µfd.

Transistors: 97–2N1485; 98–99–2N2920; 100 and 105–2N2484; 106–2N2605; 107–Field effect 2N3436; 122–123–2N2920; 126–2N2484; 127–2N2605; 128–2N2484; 143, 158, 173–2N3569; 196–Uni T 1671B; 226–2N3646; 230–field effect. T 2N3436; 233, 235–2N3646; 254–256–2N3565; 276–2N3646; 277–279–2N3565; 280–2N3646; 281–283–2N3565; 315, 318, 322, 327, 331, 338–2N3656; 340–2N3638; 344–2N3565; 410, 412, 414–2N3565; 414–2N3565; 430–2N3638; 432, 440, 441–2N3646; 493–2N3569; 514–2N3565; 515–2N3658.

Diodes 84, 86, 88, 104, 131, 154, 169, 174, 198, 199, 204–1N3605; 215–2N3638; 220, 292, 293, 301, 317, 423, 436, 442–443, 462–467, 469–485–1N3605; 487–489–1N3605.

In operation, it is first decided how many of the sample detectors 15 are to be activated for the particular test to be made and the sequence in which the detectors are to be activated. The patch panel is then connected as needed to accomplish the desired sequence and number of units in the sequence. The duration of testing time for each sample detector each time the detector is activated is then selected by means of the interval selector. The solutions to be tested are then placed in the sample detectors and power supplied to the turbidity detector. The device will thereafter automatically and sequentially test each sample for the interval selected and in the order selected. If sequencing changes are desired during testing, which can cover an extensive period of time, this can be easily accomplished by re-arrangement of the patch connections in the patch circuit.

In view of the foregoing, it can be seen that the turbidimeter of this invention provides a device that is capable of sequentially testing a selectable number of samples in any desired sequence for selectable periods of time.

What is claimed is:

1. A particle sensing device, comprising: a plurality of detectors for sensing particle presence in a plurality of samples and producing a separate current indicative of each; utilization means; a plurality of gate means for coupling said current to said utilization means from said plurality of detectors; timing means for produicng an output on a series of lines each of which is connectable with a different one of said gate means; and control means including selecting means for connecting a predetermined number of said series of lines to said gate means in a predetermined order whereby said detectors are sequentially activated in an adjustable preselected order, said control means also including switching means whereby the time duration and total number of detectors sequenced is predetermined.

2. A particle sensing device, comprising: a plurality of detectors for sensing particle presence in a plurality of samples and producing a separate current indicative of each; utilization means; gate means for coupling said detector outputs of said utilization means; timing means including a commutator for producing an output on a series of lines each of which is connectable with a different one of said gate means; and control means including selecting means for connecting a predetermined number of said series of lines to said gate means in a predetermined order whereby said detectors are sequentially activated in an adjustable preselected order, said control means also including switching means whereby the time duration and total number of detectors sequenced is predetermined.

3. The device of claim 2 wherein said timing means includes a clock pulse generating source, a digital coded output signal, and means for converting the coded signal for application to a number of lines for activation of the detectors.

4. A turbidimeter, comprising: a plurality of electro-optical detectors for sensing particle presence in a plurality of samples and producing an output current indicative of each, each said detector having a lamp; a lamp regulator including means to assure slow turn-on of each said lamp; utilization means; a plurality of relays each for connecting a different one of said detectors to said utilization means; a timer for generating a control signal and for controlling the time interval of each detector activation; a commutator for receiving said control signal and responsive thereto producing a sequential output on a series of output lines; and control means including circuit selector means for coupling a predetermined number of said output lines to a predetermined number of said relays to control actuation of said relays to thereby cause sequential activation of said detectors, said control means also including switching means whereby the time duration and total number of detectors sequenced is predetermined.

5. The turbidimeter of claim 4 wherein said utilization means includes a digital voltmeter producing a predetermined coded binary output signal and an information storage means receiving said coded binary output signal from said digital voltmeter; and further characterized by a code converter connected with said output lines from said commutator and in response to the output therefrom producing a coded binary output signal compatible with the coded binary output signal produced by said digital voltmeter, the output from said code converter being coupled to said information storage means.

6. A turbidimeter comprising: a plurality of electro-optical detectors for sensing particle presence and producing an output current indicative thereof when activated by energization of a lamp therein; a lamp regulator including means to assure slow turn-on of said lamp in each said detector; a plurality of relays including relay actuated switches for connecting said detectors to said utilization means and for controlling activation of each said detector; signal suppression means connected to each said detector to balance the output signal to a predetermined reference level; a detector amplifier connected to said relay actuated switches to receive the current therethrough from said detector; a digital voltmeter connected to said detector amplifier to receive the output therefrom; clock pulse generating means; a first binary signal producing means receiving the output from said clock pulse generating means; a commutator for receiving the output from said first binary signal producing means and responsive thereto sequentially producing an output on a series of output lines; selectable connecting means connecting said output lines to said relays for controlling the order and combination of relays actuated in sequence; a second binary signal producing means receiving the output from said clock pulse generating means; a timing resistor matrix receiving the output from said second binary signal producing means and producing a series of selectable time intervals; a selector for selecting one of said time intervals from said timing matrix; and connecting means connected between said selector and said lamp regulator for controlling the time interval of activation of each said detector.

7. A particle sensing device, comprising: a plurality of detectors for sensing particle presence in a plurality of samples and producing a separate current indicative of each; utilization means; a plurality of gate means for coupling said current to said utilization means from said plurality of detectors, said utilization means including a digital voltmeter producing a predetermined coded binary output signal and an information storage means receiving said coded binary output signal from said digital voltmeter; timing means; a code converter connected with said timing means for producing a coded binary output signal compatible with said coded binary output signal produced by said digital voltmeter, the output from said code converter being coupled to said information storage means; and control means connected with said timing means, said gate means and said detectors, said control means including selecting and switching means for readily preselecting the total number, time duration, and sequencing order and combination of currents from said plurality of detectors.

References Cited

UNITED STATES PATENTS

| | | | |
|---|---|---|---|
| 2,640,925 | 6/1953 | Hirsch | 250—27 |
| 2,807,187 | 9/1957 | Petry | 356—203X |
| 3,069,013 | 12/1962 | Neubrech et al. | 209—111.5 |
| 3,241,432 | 3/1966 | Skeggs et al. | 250—218X |
| 2,157,438 | 5/1939 | Sparks | 356—208 |
| 2,668,930 | 2/1954 | Suits | 315—52 |
| 3,102,921 | 9/1963 | Peras | 356—81X |

OTHER REFERENCES

Shurkus, "Colorimetry," Radio News, June 1944, pp. 25–27, 56, 58, 60, 71.

West, "Colorimetry and Photometric Analysis," Physical Methods Part III, Interscience-J. Wiley Pub., pp. 2036–41, N.Y. 1959.

Nawakinski, "The Case for Digital Instruments," Int'l. Electronics, January 1962, pp. 25–27 and 38.

Drenth et al., "An Automatic Integrating Microdensitometer," J-Sci. Instr., 42 March 1965.

Ward, "An Automatic Digital Colorimeter for Laboratory and Process Control Applications," Am., Dyestuff Rprtr. 55 (24), Nov. 21, 1966, pp. 55–61.

RONALD L. WIBERT, Primary Examiner

R. J. WEBSTER, Assistant Examiner

U.S. Cl. X.R.

250—218; 340—147, 163, 166, 173, 347; 356—205